United States Patent
Huang

(10) Patent No.: US 8,132,762 B2
(45) Date of Patent: Mar. 13, 2012

(54) SPACE BASED ROTATING FILM SOLAR BATTERY ARRAY

(76) Inventor: Shangli Huang, Shanzhen (CN)

( * ) Notice: Subject to any disclaimer, the term of this patent is extended or adjusted under 35 U.S.C. 154(b) by 359 days.

(21) Appl. No.: 12/508,989

(22) Filed: Jul. 24, 2009

(65) Prior Publication Data

US 2009/0283132 A1  Nov. 19, 2009

Related U.S. Application Data

(63) Continuation of application No. PCT/CN2008/070076, filed on Jan. 10, 2008.

(30) Foreign Application Priority Data

Jan. 31, 2007  (CN) .......................... 2007 1 0006856

(51) Int. Cl.
  *B64G 1/44* (2006.01)
(52) U.S. Cl. ................................... 244/172.7
(58) Field of Classification Search ............... 244/172.6, 244/172.7, 158.1, 159.5, 168; 136/243, 246, 136/245, 251
See application file for complete search history.

(56) References Cited

U.S. PATENT DOCUMENTS

| 4,030,102 A * | 6/1977 | Kaplan et al. ................. 343/915 |
| 5,296,044 A | 3/1994 | Harvey et al. |
| 5,578,139 A | 11/1996 | Jones et al. |

FOREIGN PATENT DOCUMENTS

| CN | 1341536 A | 3/2002 |
| EP | 0 884 241 A1 | 12/1998 |

OTHER PUBLICATIONS

International Search Report of PCT/CN2008/070076, dated Apr. 10, 2008.
English translation of<<Space Station and Space Platform>> p. 396-397. Of knowledge to applicant prior to PCT International Filing date, Jan. 10, 2008.

* cited by examiner

*Primary Examiner* — Timothy D Collins
*Assistant Examiner* — Nicholas McFall
(74) *Attorney, Agent, or Firm* — Hamre, Schumann, Mueller & Larson, P.C.

(57) ABSTRACT

A self rotating deployed film solar battery array includes film solar batteries, electrical cables, a center axle and connecting lines. A plurality of long strip shaped film solar batteries radiate to form a circle or a polygon-array. Two adjacent film solar batteries are linked by connecting lines. Each film solar battery is linked to the center axle by electrical cables. The film solar batteries are deployed and maintained in an array shape by a self rotating centrifugal force in space. The film solar batteries are coiling outside the surface of the center axle before their deployment. The unit weight of a thin film battery is only 1/30 of a traditional solar cell paddle.

13 Claims, 20 Drawing Sheets

SPACE BASED ROTATING FILM SOLAR BATTERY ARRAY

FIELD OF THE INVENTION

This invention is about the construction of a solar battery array used in spaceflight—more detailed about the device utilized to control a spaceflight's soft film solar battery array which is foldable an deployable in spaceflight applications.

BACKGROUND ART

Most current spaceflights adopt solar energy powered battery. A solar battery array can be installed either inside the spaceflight or outside in a form sail board. The solar-direction-detecting sail board batteries can provide more resource of electric power than batteries. In order to increase energy density out of a solar battery array, Hughes Aircraft Company has selected "soft folding solar batteries sail" (see, Space Station and Space Platform, pages 396-97). In order to deploy this kind of soft sail, the need of installing a solid holder and a limit of its size eventually becomes inevitable—energy density is not high enough (47 w/kg)—therefore the "soft coiling solar batteries sail" has not been widely selected.

SUMMARY OF THE INVENTION

The purpose of this invention: to implement a light film solar battery array which is small-sized, portable in spaceflight and orderly deploying in a large sized array by self-rotating after the spacecraft orbited in space, and to apply the film solar battery array to all kind of spaceflight devices.

The implementation of this project: many long-strip-shaped film solar batteries radiate to from an annular or a polygon array. When linking two adjacent film solar batteries with a connecting cable, each film solar battery links to a center axle with electrical cable in the middle of the array. Films deployed and maintained in an array shape by self-rotating centrifugal force in space. Film batteries are coiling outside the surface of the center axle before their deployment. The electrical cable linking film to the center axle has two usages. Firstly, it leads electric current, produced from the film battery, to the center axle. Secondly, it endures rotating tensile force coming from the film battery array. The insulated layer of electrical cable contains high-strength fibers that basically endures rotating tensile force. A kind of light, soft-and-strong string or braid is used to connect adjacent film batteries.

The strip film batteries can be shaped into a matrix, its length-to-width ratio is greater than 3. It also can be shaped into a one-side-wider strip (the narrower side close to the array's center while the wider side close to the array's rim) as a fan or trapezoid. The outlet of each film battery links to the center axle in the middle of the array through a cable which is secured at one side (toward the middle of the array) of the film. Inside of the center axle, several plates installed with a control and driving device which can roll in and out electrical cable. Before deploying the film batteries, they orderly stacked up and coiled on the surface of the center axle, and the electrical cable in the plates which installed inside of the center axle, respectively connected to its associated film battery.

So called "center axle" is divided into an inner and outer ring (Somewhat like a bearing). There are wheels installed in between the inner and outer ring. The outer ring can roll around the inner ring. Cable plates and control devices are secured on the inner wall of the outer ring.

One side of the center axle can connect a folding holder to the body of a spaceflight object. It also can harness on the shell of a spaceflight object in a form of cylindrical shape.

If the spaceflight object can spin with the film solar battery array, then the cylindrical spaceflight object can serve as a center axle.

The coiling film battery around the center axle can be secured with a piece of string. After the spaceflight object orbited, the center axle starts to spin (along the center axle line of itself), and the string is loosened off automatically from a remote signal, then the films gradually deploy, according to centrifugal force, to form a 2 dimensional array.

To adapt this invention for various spaceflight objects: a film solar battery array can be used in various space satellites which need high-power electric resource. The satellites need detecting sunlight-direction can have a center axle directly saddled on their shell (cylindrical type of body); other direction detecting models (like global positioning satellites) can link a universal holder to a foldable pole-support which links to the center axle. Thus, the satellites and the film solar battery array can position their own direction respectively. Satellites, which adopt the later model with a foldable pole-support, may minimize their structure size as a whole before the launching time.

Thin film solar battery array may be utilized in the space station: when the international space station is under construction, aerospace craft needs multiple launches to send several dozen tons solar battery boards to orbit and cosmonauts need spacewalk many times to install solar batteries sail in place, yet the installation has not been currently completed. But a bigger and more powerful film solar batteries array, weighed approximately a little more than 1 ton, needs only one launch into orbit and deploys itself automatically.

A thin film solar battery array may be utilized in a solar energy powered rocket: at present ion propeller has been widely used in the satellite's attitude control and track maintenance. The US Aerospace Bureau's "Deep Space 1st Detector", launched in 1998, and The European Astronautics Bureau's "SMART-1 lunar probe", launched in 2003, both use ion propeller to push the engine for the last stage host. Now these two detectors have completely experimented through the test plan that proves the long-lasting reliability that an ion rocket engine can make. At present, the bottleneck for the electric power is to enhance the thrust force with an ion engine. The specific energy produced from an existing solar batteries wind surf board is too low, (approximately 40 tiles/kilograms); it can not provide formidable electric power. To enlarge the area size for the solar wind surf board is not only to increase the weight greatly, but also with difficulty to meet the structural strength required for the board. But a thin film solar battery array has got high specific energy (approximately 10 times to the former one), moreover, it is maintained by cables and thin film tensity (self-rotating to produce centrifugal force), can endure bigger impulse and acceleration, extremely suits for a high-efficiency electric rocket. A solar electric rocket equipped with a thin film battery array as the last stage rocket, might send a large-scaled satellite or spaceship from low Earth orbit to high orbit, even to interplanet space. Because electrically-powered rockets' "specific impulse" is 10 times higher than a chemical rockets, it may save massive fuels. Using a solar electric rocket as the last stage rocket will greatly reduce weight from the front stage rocket, and so saves launching expense. A high-efficiency electrically-powered rocket equipped with a thin film solar battery array is especially suitable for a deep space survey, human Moon-landing and long-range flight to Mars. The high-efficiency solar electric rocket may serve as an orbital transfer vehicle (OTV) for a long-term movement along the Earth orbit. It is applied in changing satellite's track too. For example it will push a spacecraft from a lower Earth orbit up to high orbit, even to a geosynchronous Earth orbit.

Remarkable advantages when comparing this invention to a solar battery array for existing spacecrafts:

The unit-area weight of a thin film solar battery array is very light, only 1/30 to 1/100 weight to a traditional solar cell wind surf board, that will greatly reduce the launching-weight for spacecrafts and so save a remarkable launching-cost.

A thin film solar battery array may have area-size that is 100 times bigger than that of a conventional solar batteries sail, and may coil into a very small size for spacecrafts to carry before the blast off into the sky.

The sufficient electric power generated from a thin film solar battery array may enhance the power dozens of times for the television direct transmission satellite and the communications satellite.

A thin film solar battery array can endure greater acceleration and impulse. During spacecraft accelerating or changing orbit flight, it is unnecessary to coil the battery array, especially suitable for a solar energy electrically-powered rocket. Satellites equipped with a solar energy electrically-powered rocket may greatly enhance the ability to maintain on orbit and the capability to maneuver, and double the length of service life. Deep space detectors and spaceships equipped with a high efficiency solar energy electrically-powered rocket may remarkably enhance navigation speed, reduce survey cycle or round-trip time.

The following with attached figures are detailed descriptions about implementation plans for this invention.

DETAILED DESCRIPTION OF THE EMBODIMENTS

Implementation Example 1

A Battery Array is Made of Rectangle Film Solar Batteries

Figure 1:
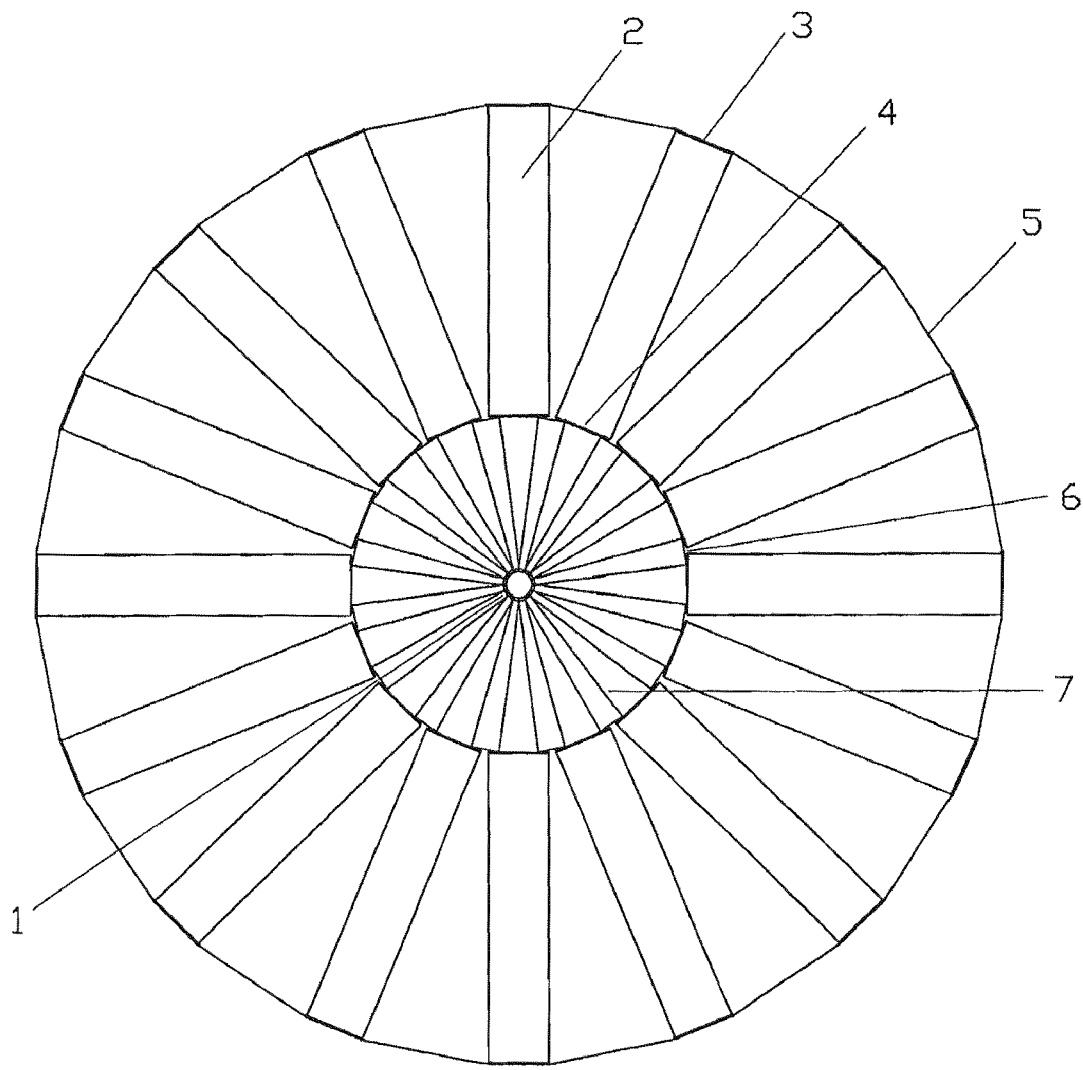
FIG. 1: Completely Deployed Rectangular Thin Film Solar Battery Array (top view)
Figure 2:
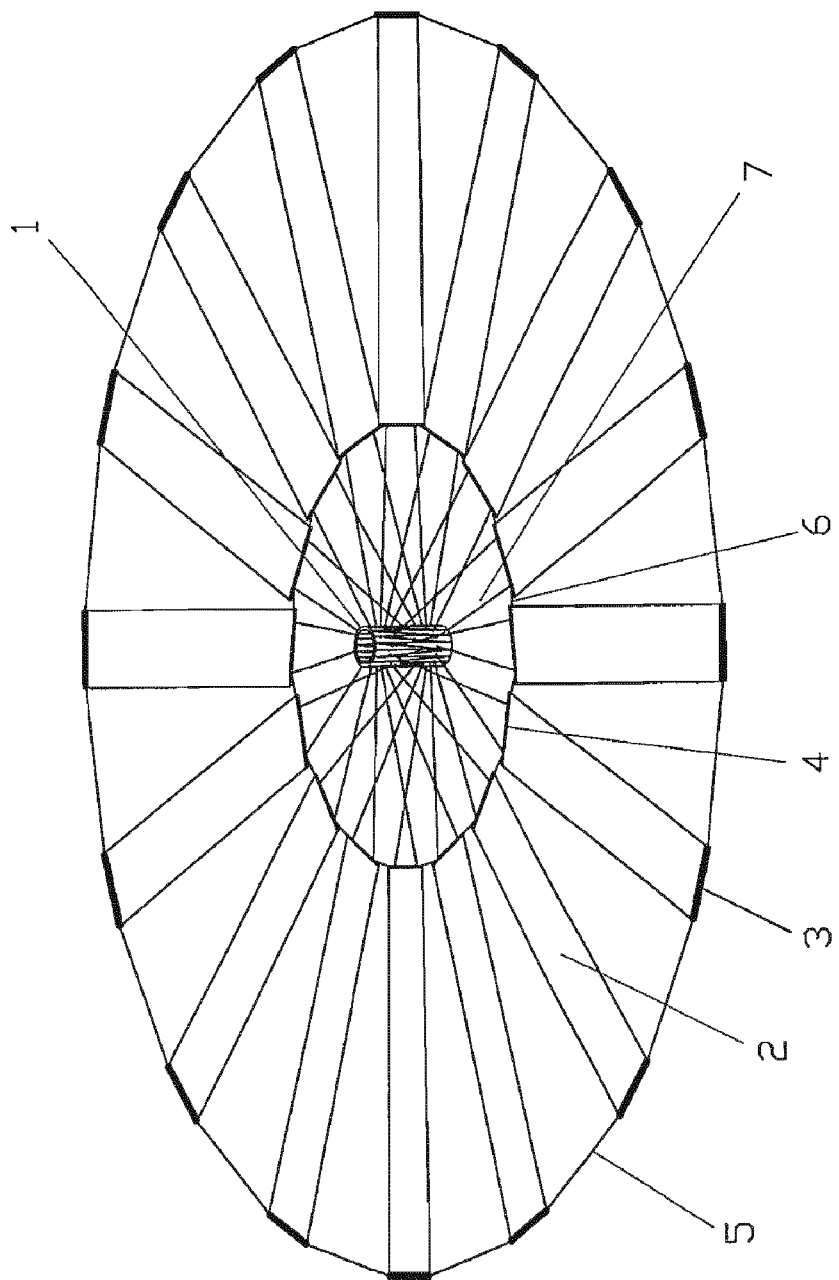
FIG. 2: Completely Deployed Rectangular Thin Film Solar Battery Array (three-dimensional schematic drawing)
Figure 5:
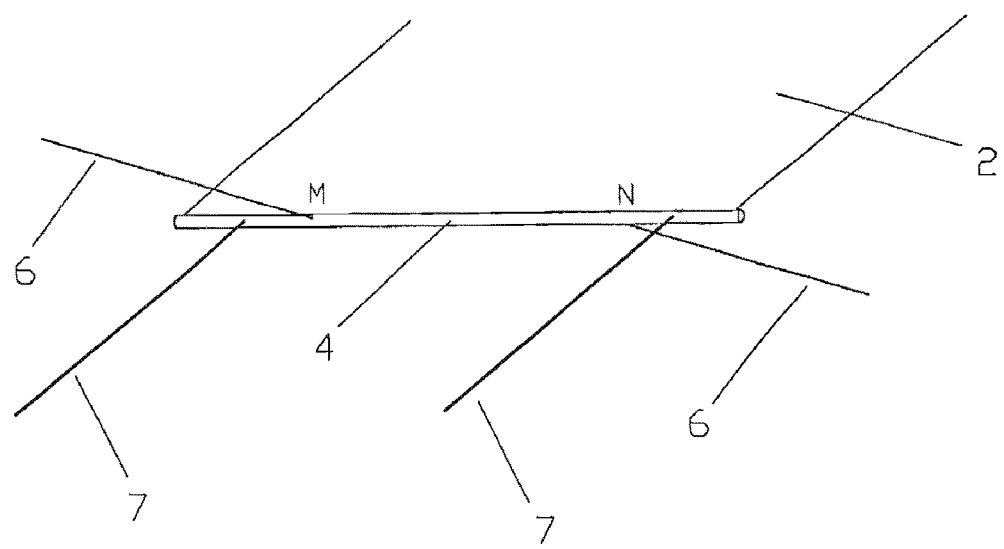
FIG. 5: Schematic Drawing for Thin Film Battery inside Reinforcing Rod Connection

FIG. 1 shows top-view of a completely deployed rectangular thin film battery array. The center axle (1) located at the middle battery array. The thin film batteries (2) (16 spokes) radiates out to form a circular shaped array. The neighboring thin film batteries are connected with outside ring cable (5) and inside ring cable (6). Near the center array, one end of each thin film battery array connects the center axle (1) with electrical cable (7) (this example has 32 cables). The thin film battery (2) has outside reinforcing rod (3) and inside reinforcing rod (4) at both end, used to protect the thin film battery and control thin film's direction. FIG. 2 is a three-dimensional schematic drawing for the thin film solar battery array described above, (All attached numbering figures are consistently used in this instruction booklet. The names of various components in the figure are not given unnecessary details.) FIG. 2 shows each thin film has two pieces of parallel electrical cable is on a horizontal plane at one end of a film battery, but roughly skewed 90 degree at the other end to the center axle on same perpendicular line. After self-rotating deployment of a thin film battery array, under centrifugal force, the ring-like array has tendency to deploy outward. Due to the restraint from the linking cable to the outer ring (5) and the linking cable to the inner ring (6), all thin film batteries can only deploy to the longest radius which is determined by the length of reinforcing rod, inner ring and outer ring cables. All the length of electrical cables and connected inner and outer ring cables must maintain a certain proportion relation. All criteria are measured by the structured size of the fully deployed thin film battery array. FIG. 5 is a partial structure, an enlarged drawing for FIG. 1 to show the method for inside reinforcing rod (4) to link with electrical cable (7) and inner ring cable (6). The junction M, N of inner ring cable (6) and inside reinforcing rod (4), is not set at the end of the rod, but apart at where 25%-30% from the end of the rod, and inner ring cable (6) has 50%-60% of the reinforcing rod length (this causes the thin film battery to deploy with a minimum of inner loop radius, and levels the thin film on a plane). When thin film batteries coiling on the center axle, inside reinforcing rods paralleled evenly on the outside surface of the center axle.

Figure 6:
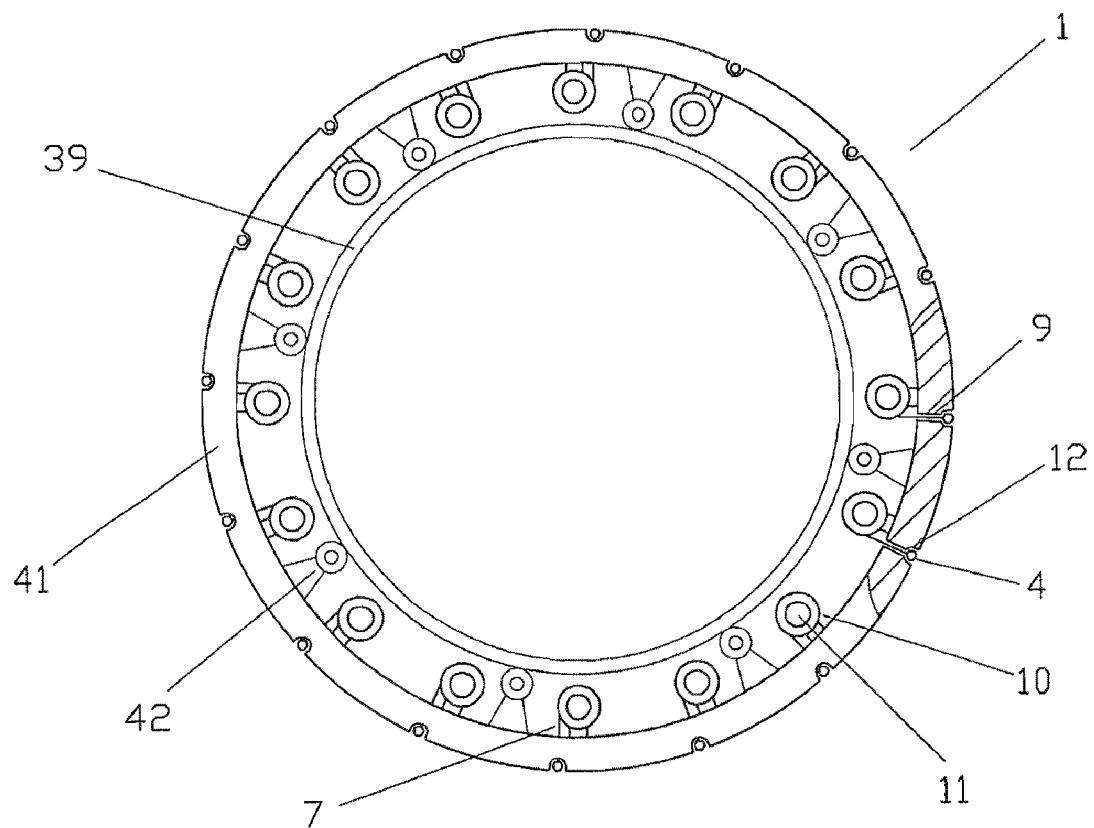
FIG. 6: Side Schematic Drawing for Center Axle

Like FIG. 6 shows: on the outer ring's (41) surface at the axis center, there is a groove (12) parallel to the center of the axle. The angular distance between grooves is $2\pi/n$ radian (n is thin film strip number). The inside reinforcing rod of each thin film (4) is placed in the groove separately. The outer ring (41) of the center axle harnesses on the inner ring (39). There are wheels installed between the inner and outer ring (42).

Figure 7:
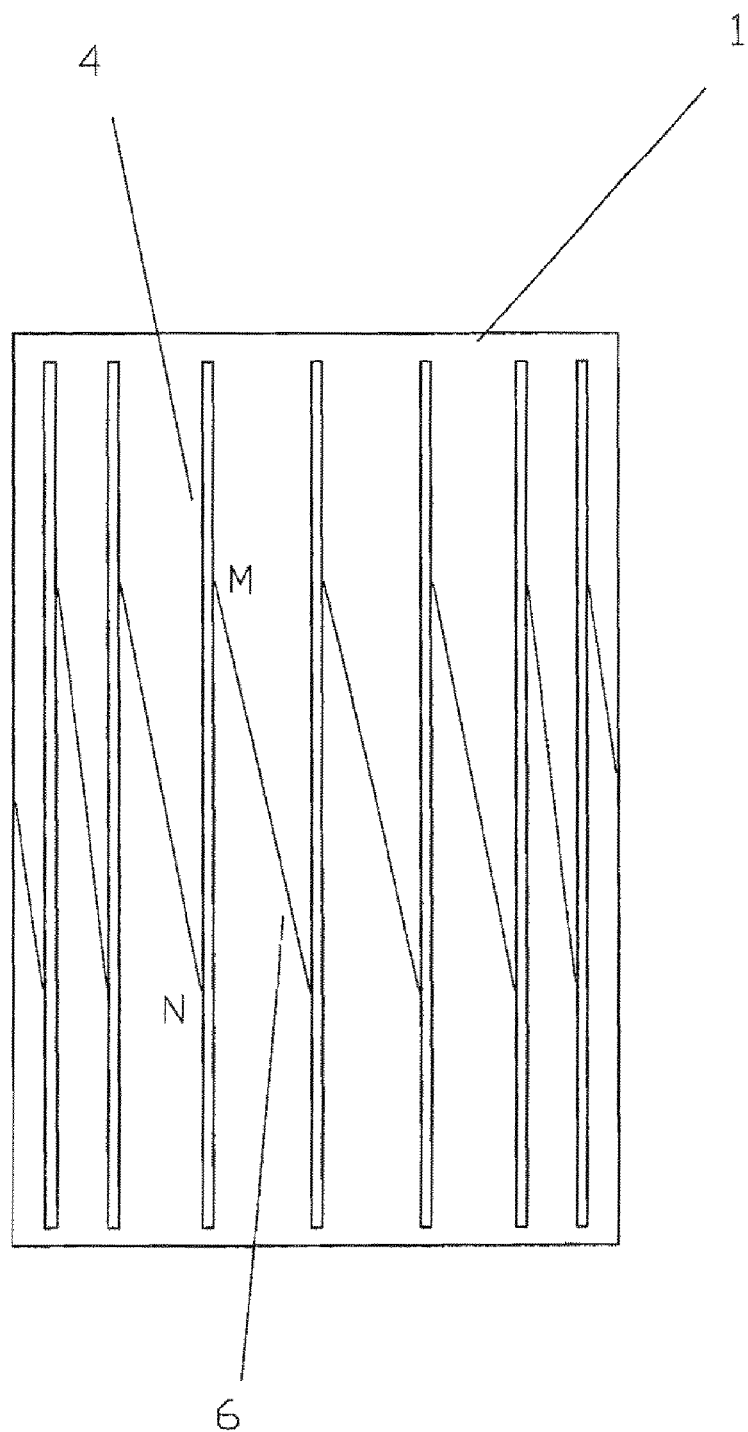
FIG. 7: Schematic Drawing for Inside Reinforcing Rod in (linearity thin film battery array) Center Surface Arrangement

Like FIG. 7 shows: the inside reinforcing rods (4), paralleled outside the center axle (1), connect each other with inner cable (6). If the length between two inside reinforcing rods is a, the rod length is b, and the required length between the end of neighboring inside reinforcing rods close to 0 after deployment, then the length from the junction of M and N to the end of the rod is (a2+b2)/4b, and the length of inner ring connecting cable (6) is (a2+b2)/2b.

The inner ring connecting cable (6) can also connect to the end of neighboring inside reinforcing rod (4); only a small reel of coiling inner ring connecting cable (6) and a micro motor hence in need to be installed in. The inner ring connecting cable (6) coils on the reel. When thin film batteries are closed in a truss, the exposed length of inner ring connecting cable (6) is slightly longer than the inside reinforcing rod's length. After the thin film battery array deployed, the micro motor-driven reel pulls in the inner ring connecting cable, enables the end length of neighboring inside reinforcing rod (4) close to zero, thus it causes the deployed thin film in an ideal plane. Through pulling and loosening the inner ring connecting cable (6), the inclining angle of the leaf blade can be controlled.

The following is a method that thin film batteries are overlapping on center axle (1): Like FIG. 6 shows: on the inner wall of the outer ring of the center axle (41), many electric-cable reels (10) are evenly installed. On the axle of electrical cable reel, an electrical machinery (11) is installed. The reel's electrical cable passes through a hole (9) on the outer ring's wall and connects to an inside reinforcing rod (4) which lays inside of the groove (12). The center axle (1) has count of 1.021.1 times in length to the width of a thin film battery (2). Thin film batteries are faceup overlapping and coiling in the same direction on the center axle (1) (this coiling way is called "overlapping coil in the same direction"). After the coiling finished, they are fastened with a special string. This string may drop automatically by a remote control signal to unleash those thin films and so deployed from their self-rotating process.

Figure 9:
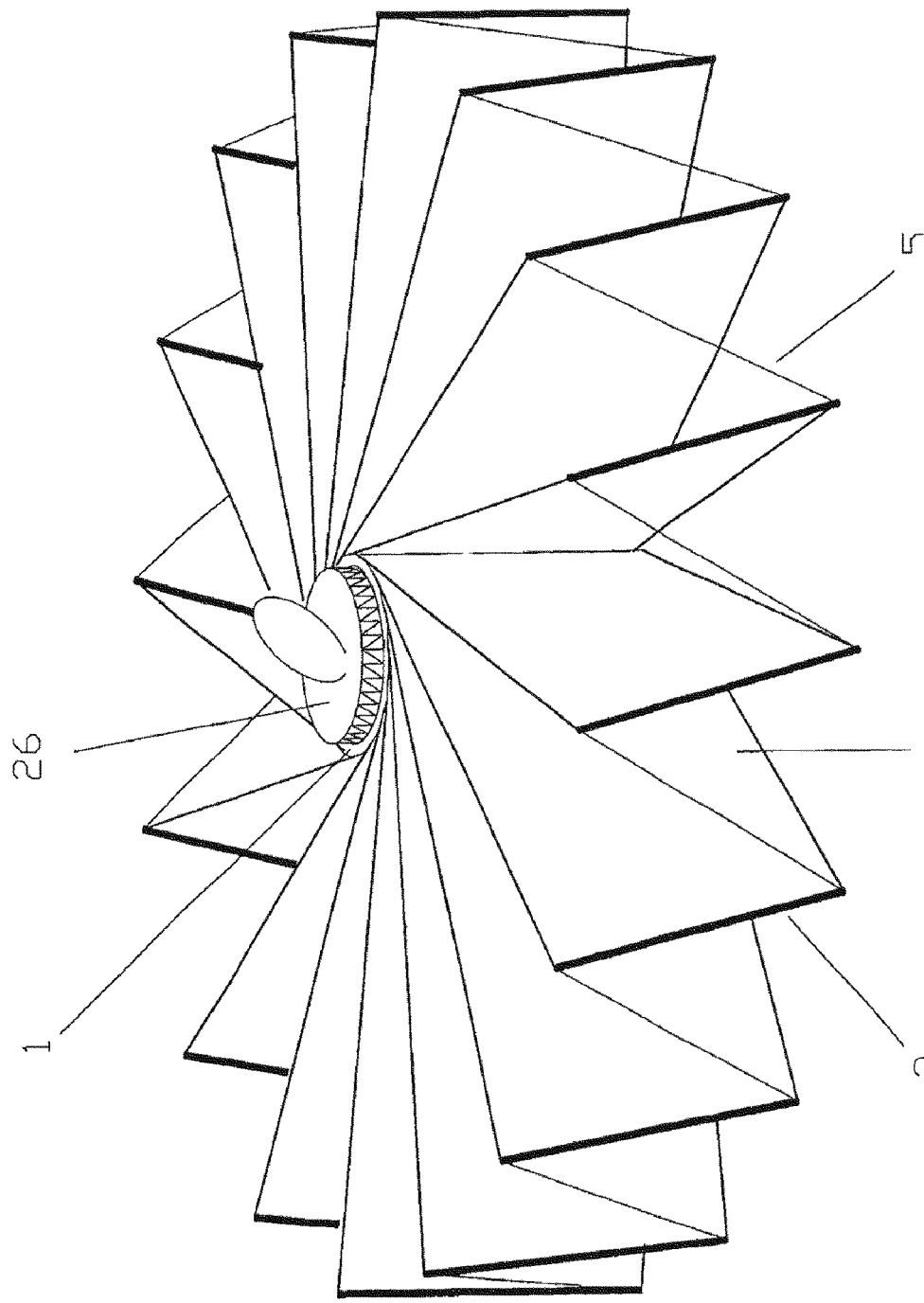
FIG. 9: Schematic Drawing for In Deployment Processing of Thin Film Solar Battery Array

FIG. 9 is a schematic drawing about the above deployment processing for a thin film battery array; the center axle (1) harnesses on the outside column of a satellite (26) and spins counter clockwise (overlook view). The coiling thin film battery (2) has partially deployed. The outer ring cable connecting neighboring thin film batteries (5) holds the deployment processing of the thin film, that causes the vertically positioned outside reinforcing rod (3) to decline gradually. (After thin film batteries fully deployed, they are turning into a horizontal plane.) In the process of deployment, the inner ring connecting cable (6) gradually pulls the inside reinforcing rod (4) from a vertical to horizontal plane. That causes thin film batteries to form a planar array of radiation shape. Because the outer ring connecting cable (5) is longer, before the process of thin film deployment, partial connecting cable may coil inside of inner reinforcing rod (3), gradually being pulled out in the process of deployment.

Figure 10:
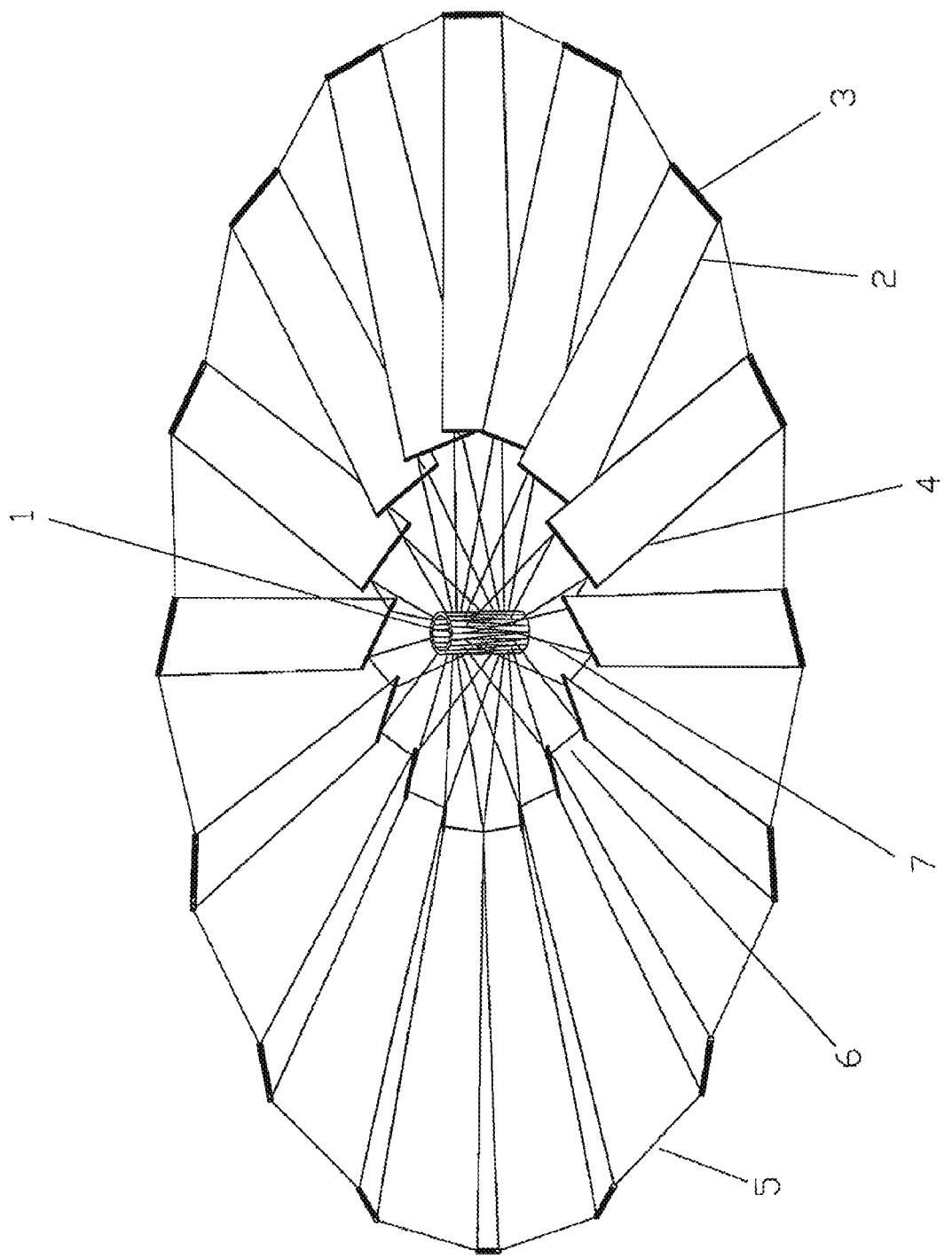
FIG. 10: Schematic Drawing for Inclining Leaf Blade of Thin Film Solar Battery Array

From the above description, before thin film solar batteries completely deployed, all thin films inclined (similar to windmill's leaf blades), it may use this characteristic to the control leaf blades' (thin film batteries, similarly hereinafter.) tilt angle: the more volume of electrical cable (7) pulled back in, the bigger angle of the leaf blade tilted. FIG. 10 is a thin film battery schematic drawing, in which the electrical cable (7) pulled back, thus the array's radius reduced, and the thin film battery's inner ring (constructed by an inner ring connecting cable (6) and inside reinforcing rod. (4)) and outer ring (constructed by an outer ring connecting cable (5) and outside reinforcing rod (3)) is loosening. Under a portion of vertical pulling force that causes inside reinforcing rod and outside reinforcing rod to tilt, thus inclines the leaf blade. As a result of solar light pressure function, the tilted leaf blade can generate weak torque to a thin film battery, thus change the thin film battery's self-rotating speed. Spacecrafts orbiting around the Earth for a long time, the spatial micro resistance (including low track aerodynamical resistance, gravity gradiometry, solar radiation and so on) can be slowing down their self-rotating speed, it needs regularly to start posture control rocket to keep the rotation speed. Using optical pressure to cause the giant thin film battery array to maintain self-rotating speed will save rocket fuel for a long time in space operation.

In a low Earth orbit below 700 kilometer, the resistance of low-density atmosphere is greater than optical pressure. The thin film battery array with inclining leaf blades takes effect, like a genuine windmill being pushed to spin, from the thin super-aerodynamic flow to spin. The electrical cable reel (10) and the micromotor (11) installed in the center axle (1) not only control the inclining of leaf blade through the action of receiving or releasing cable, but also adjust the center-of-gravity position of thin film solar batteries through the action of partially receiving or releasing cable to have superposition with the axis center of center axle, that avoids to disturb the spacecraft from a spinning motion of the battery.

FIG. 1 shows a thin film solar battery array. If its diameter is 30 meters, then according to the proportion in the figure, each thin film length is 10 meters, width 2 meters, area 20 square meters, 16 thin film batteries area makes 320 square meters. The center axle diameter is 1 meter, length 2.1 meters, and electrical cable length 4.8 meters. Below is a weight calculation for this thin film battery array according to the above measure: outer diameter is 1 meter for the center axle (1) with wall thickness 3 centimeters, the honeycomb which is composed by carbon fiber compound material, weighed 19.2 kilograms; cross-sectional area of the electrical cable core is 4 $mm^2$, in the insulating layer has implanted with high-strength textile fiber. The gross weight of 32 electrical cables is 2.5 kilograms, each square meter of the thin film battery weighs 150 grams, total area 320 square meters and gross weight 48 kilograms; the reinforcing rod diameter is 3 centimeters, length 2 meters, is a thin wall hollow tubes of strong carbon fiber, each weighs 280 grams, gross weights of 32 is 9 kilograms; the electrical cable reel and the micro electrical machinery is 400 grams, gross weight of set 32 is 12.8 kilograms. The gross weight of a thin film battery array with all parts composed is 91.5 kilograms. If each square meter solar radiation power in outerspace is 1.3 KW, the thin film battery efficiency is 10%, the battery active surface is 90%, then electricity generation power from 320 square meters thin films batteries is 37.44 KW. A thin film solar battery array specific energy is 409 w/kilogram, 10 or more times higher than a traditional battery with a solar batteries sail. A thin film solar battery array of 100 meters diameter, with total area of 3,555 square meters, electricity generation power of 416 KW and the gross weight of 1.2 tons, can be sent one trip to orbit with rocket and automatically deployed. (After international space station is completely constructed, its giant solar battery array can only produce electricity a little more than 200 KW, yet weighed over 50 tons.)

A size of 100 meter diameter's thin film solar battery array is a medium scaled one when over a size of 500 meters diameter can be a large-scaled one which can be sent to orbit and automatically deployed. Its power may reach above 10,000 KW. The longer of the diameter for the thin film battery array is, the more number of thin film strip needs. The quantity of the strips for the thin film generally has 6~60 in count. A thin film battery diameter is nb/pi+2L, (n is thin film strip number, b is thin film width, L is thin film length). Because the thin film coiling on the center axle, its width must be slightly shorter than the center axle length, but the center axle length generally cannot surpass 15 meters, therefore having a larger thin film battery area mainly depends on increasing the quantity and length of the thin film.

Implementation Example 2

A Battery Array Constructed by Fan-Shaped Thin Film Batteries

Figure 3:
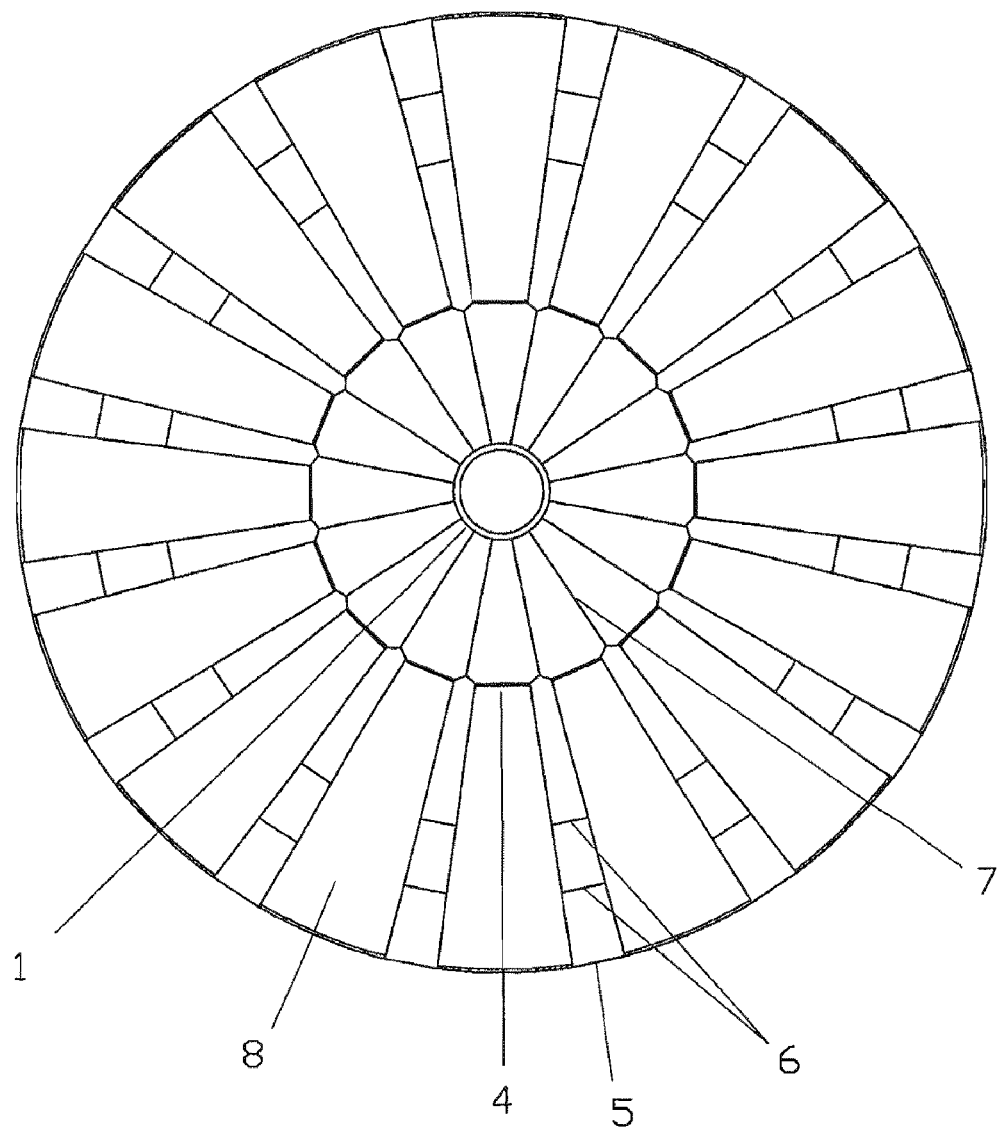
FIG. 3: Completely Deployed Rectangular Thin Film Solar Battery Array (front view)

FIG. 3 shows the front-view of a completely deployed fan-shaped thin film battery array: the fan-shaped thin film solar batteries (8) spoke to form a circular. The neighboring thin film batteries are connected with outer ring (5) and inner ring cable (6). Near the center of the array, the thin film battery has inside reinforcing rod (4). Both sides of reinforcing rod have electrical able (7) connecting to the center axle (1). (Because two end sides of neighboring inside reinforcing rods are too close, electrical cables leading out from two ends form a y-shaped connecting cable which in FIG. 3 shows.

Figure 4:
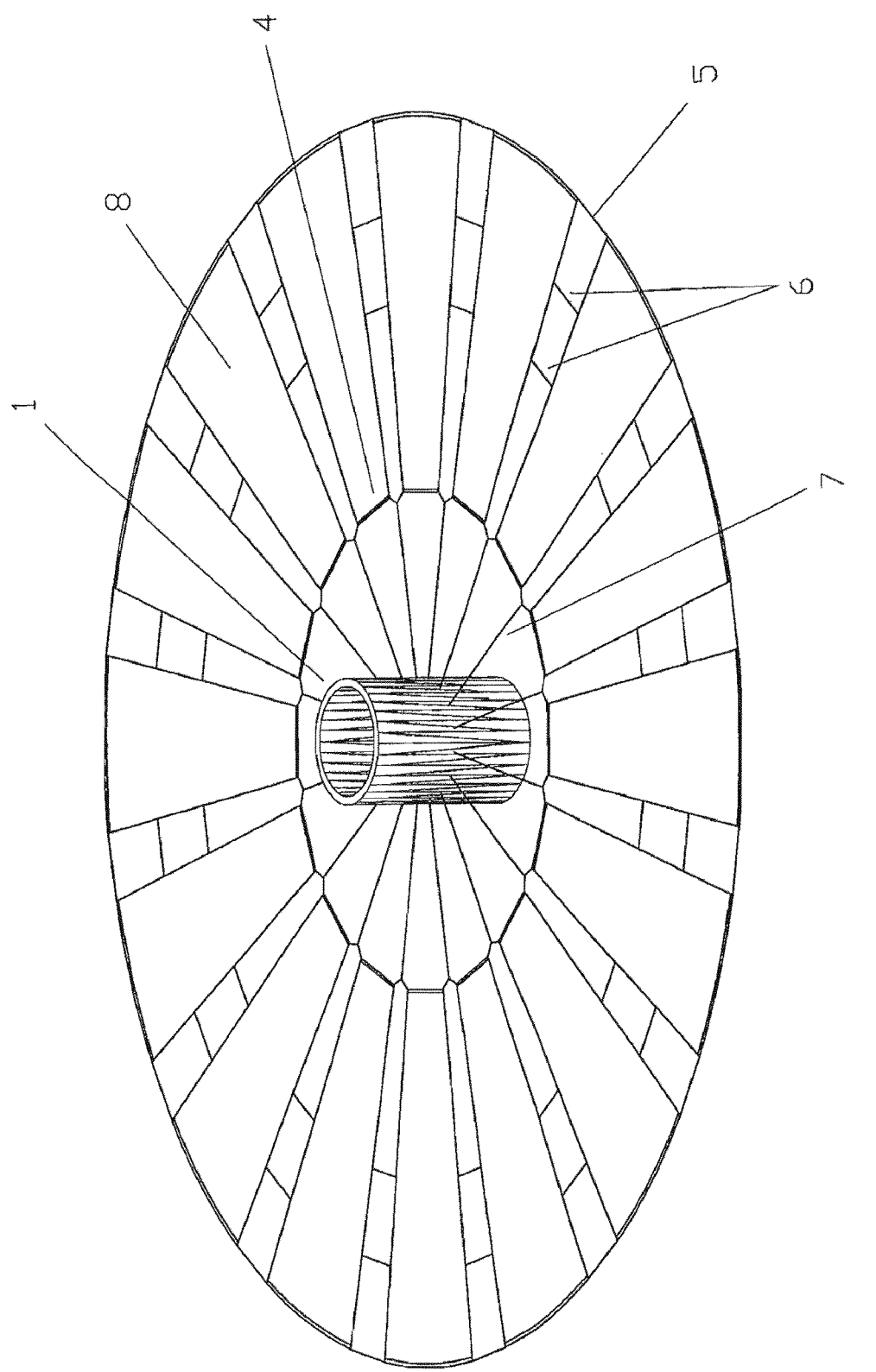
FIG. 4: Completely Deployed Fan-shaped Thin Film Solar Battery Array (three-dimensional schematic drawing)
Figure 8:
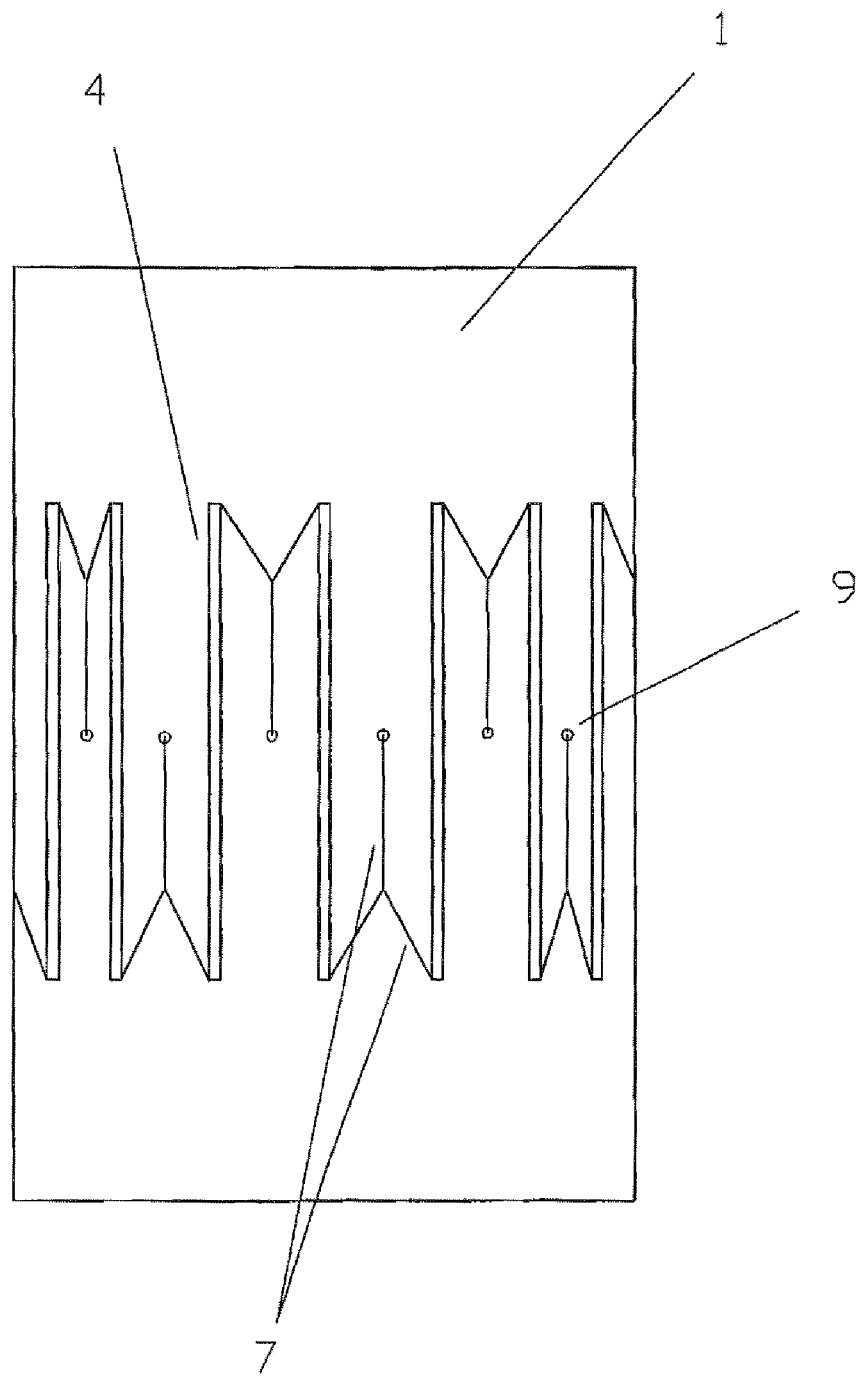
FIG. 8: Schematic Drawing for Inside Reinforcing Rod in (fan-shaped thin film battery) Center Axle Surface Arrangement

FIG. 4 is a completely deployed three-dimensional schematic drawing of a fan-shaped thin film battery array: obviously unlike a rectangular thin film battery array, electrical cable (7) is completely set in a plane with the thin film battery, therefore the thin film battery inclining angle is unable to adjust, also unable to use optical pressure or super aerodynamic flow to enhance self-rotating speed. When this kind of thin film battery array is not in deployment, a different overlapping and coiling method is adopted: a rectangular thin film battery array is coiling in "overlapping in the same direction", but a fan-shaped thin film battery array is coiling in "overlapping in the reverse direction": thin film batteries are counter-overlapped each other to coil on the center axle. (Similar to the way that a folding fan to overlap). When a fan-shaped thin film battery array is not in deployment, its inside reinforcing rod (4) on the center axle (1) arranged as FIG. 8 shows: the inside reinforcing rod's length is obviously shorter then the center axle's (1) length (because the center axle's length must be longer than or equal to a fan-shaped thin film's extreme breadth.) The electrical cable (7) passes through a hole on the center axle wall (9), separately connects to the two neighboring reinforcing rods' end. Comparing to a rectangular thin film battery array with the same battery area, a fan-shaped thin film battery array has advantage of shorter radius and needs half number of electrical cable reels and electrical motors. But a fan-shaped thin film battery array is only suitable for a middle or small scaled one.

As for a small scaled thin film solar battery array that doesn't have extreme requirement, may also eliminate the need of cable reels and the actuation electrical motors. It may coil electrical cables and thin film batteries together on the center axle's surface. (But this is unable to adjust leaf blade inclination angle and center gravity of the battery).

Implementation Example 3

The Plan to Reduce Center Axle Diameter

Figure 11:
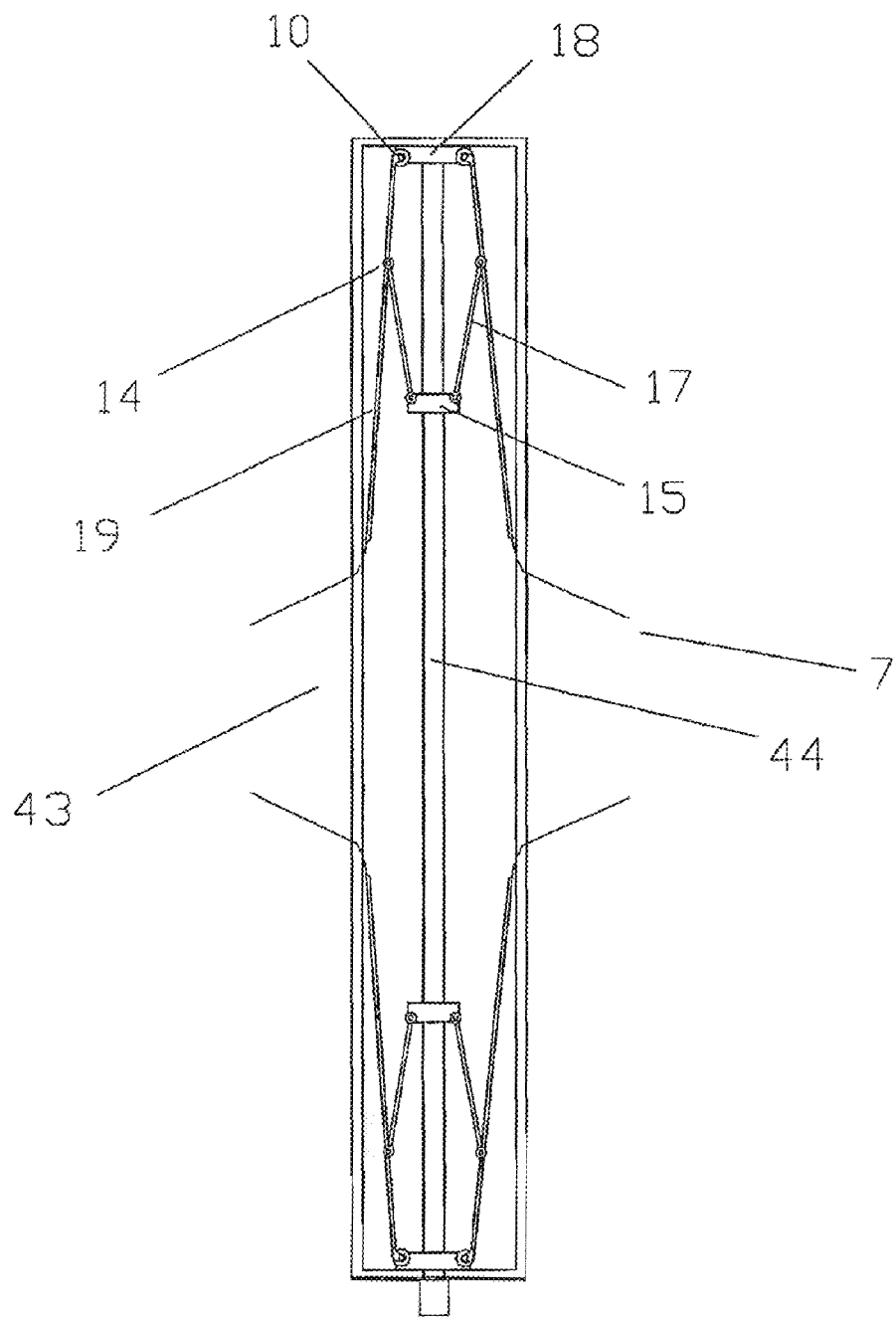
FIG. 11: Cutaway View for Closed Umbrella Bone Structure

In the most situations, a center axle certainly is not a spacecraft's main body. Fitting into a spacecraft to carry before lifting off, a thin film battery array should minimize its size by reducing the diameter of the center axle as much as possible. When the center axle diameter is 5% smaller than the thin film battery array's diameter after its deployment, the control to the thin film battery array action is very weak. In order to solve this problem, it may use one kind of structure similar to umbrella skeleton inside the center axle. Like FIG. 11 shows: the center axle (43) exterior is a tall and slender cylindrical shell, the umbrella column (44) passing through the center of the center axle (43), setting with an upper plate at its top (18), the umbrella bone (19) connecting to the upper plate (18) with a hinge joint, and the electrical cable plate (10) is harnessed on the axle of the hinge. The umbrella bone (19) is a hollow tube, made out of carbon fiber compound material, the electrical cable (7) runs from the electrical cable plate (10), through the hollow umbrella bone (19), then out of the other end. One end of the supporting rod (17), with a hinge (14), connects to the umbrella bone (19), another end, with a hinge, connects to the bottom plate (15), which (15) harnesses on the umbrella column (44), may slide up and down, along the umbrella column.

Figure 12:
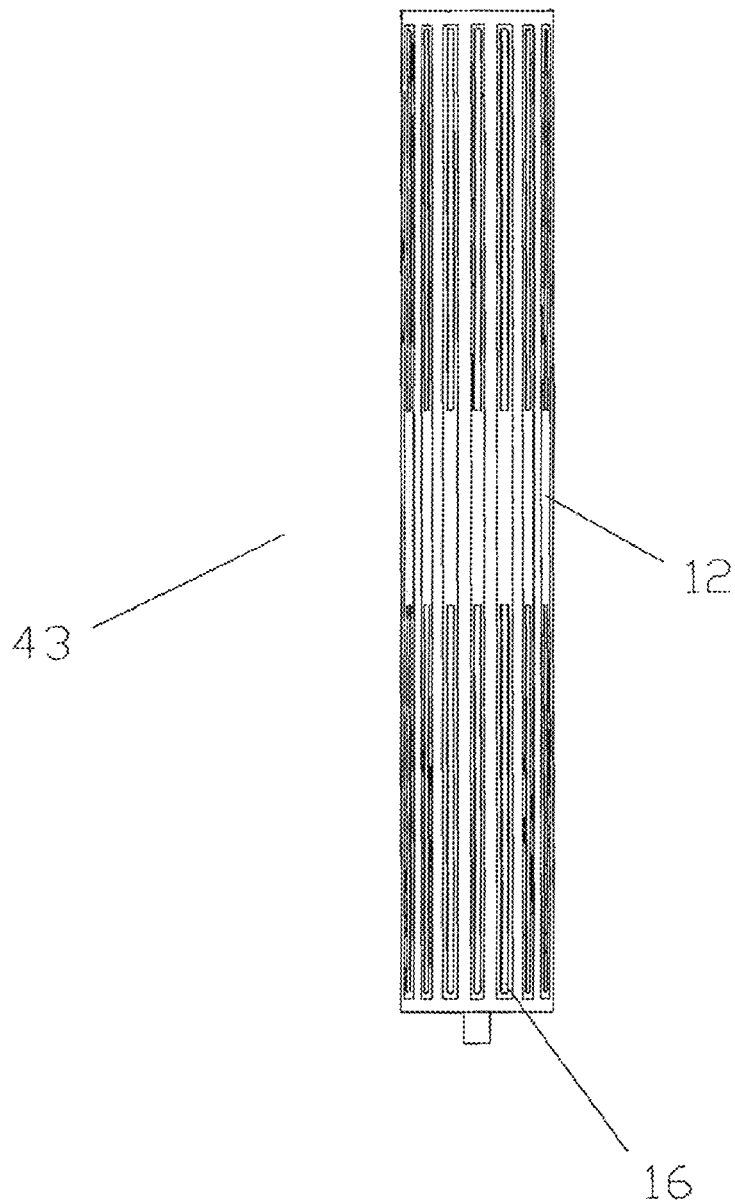
FIG. 12: Cutaway View for Center Axle with Internal Umbrella Bone
Figure 13:
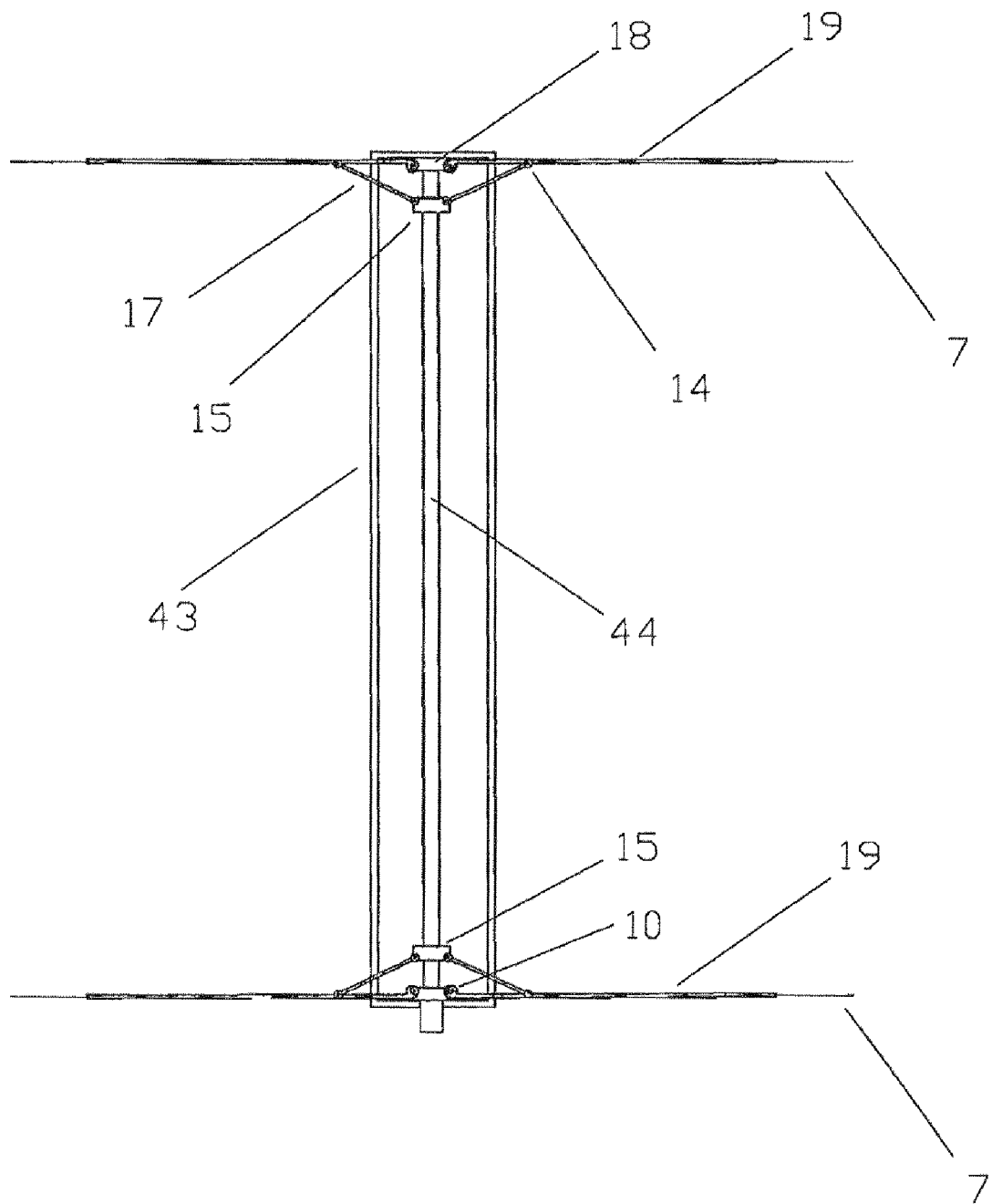
FIG. 13: Cutaway View for Deployed Umbrella Bone Structure

At both ends of the umbrella column (44), respectively installed two sets of umbrella skeleton to control n pieces of electrical cable (n is thin film batteries number). In order to enable the umbrella bone to open, on the center axle wall (43), parallel to generatrix, has 2n slits (n is number of strips for film batteries), like FIG. 12 shows. When a film battery array completely deployed and the inside reinforcing rod (4) is also separating from the center axle surface, the lower bearing (15) is moving upwardly (lower part of umbrella skeleton is moving downwardly), through the support rod (17) and the hinge (14) that opens the umbrella bone (19). After the umbrella bone completely deployed like FIG. 13 shows. The umbrella bone (19) is vertical to umbrella column (44) to form an umbrella bone array of radiation shape. Its diameter length is several times longer than the center axle diameter, that greatly enhances the control of the thin film array.

Implementation of a Thin Film Solar Battery Array with 4 Leaf Blades which May Flipover:

As a result of changing direction for a solar energy electrically-powered rocket a solar battery array may turn its back to the sunlight. If leaf blades of a solar battery array can turn over that may be a satisfactory answer to this problem, for this, only changing a fixed connection of a thin film battery's inner ring cable (5) and outer ring cable (6) on the reinforcing rod to a moveable connection that will solve the problem.

Figure 14:
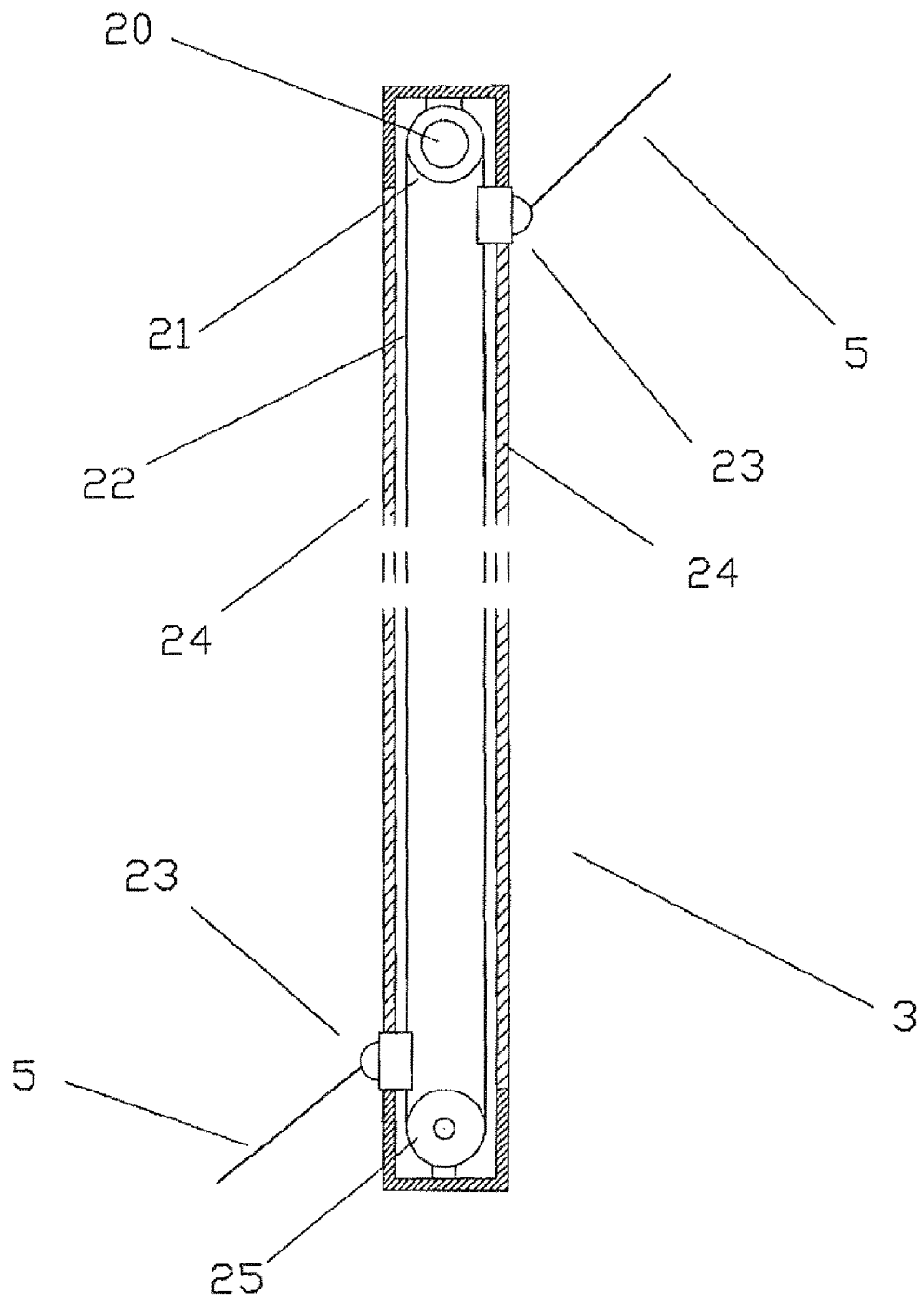
FIG. 14: Schematic Drawing for Installed Outside Reinforcing Rod with Slide Flank

FIG. 14 is the section plane of a moveable outside reinforcing rod schematic drawing: inside an outside reinforcing rod (3) has installed a micromotor (20) and driving gear (21) at top, and a pulley at bottom (25). The driving gear (21) and the pulley (25) has traction cable (22), and two slide blocks (23) secured separately on the traction cable (22), the slide block (23) may slide in the slid-grooves on the right and left side of the pole (24), the slide block is connecting to outer ring connecting cable (5). The micromotor (20), under the remote control signal, through the driving gear (21) and traction cable (22), controls the slide block (23) to skid on the pole. Inner reinforcing rod (4) and inner ring connecting cable (6) also adopt a movable method that is basically the same structure like outer reinforcing rod. From a remote control command, after the deployment of a thin film battery array, all inner connecting cables and outer connecting cables slide from one side on the reinforcing rod to the other side at the same time, thus all the leaf blades of a thin film battery array complete an 180 degree turnover (in the processing of blades turnover, the array radius will be reduced then recovered again and the length of electric cables should be shortened then recovered accordingly. If the leaf blades of a thin film battery array are flip over one by one, then changes of the array radius is very small in the flip over process.) The above leaf blade of turn over pattern is only suitable for a linear thin film battery array.

Implementation Example 5

The Thin Film Solar Battery Array and Satellite Connection Plan (A) center axle sleeve joint method: like FIG. 9 shows that the center axle (1) set on the outer shell of the cylindrical satellite (26), a thin film battery array deploys around the satellite, and the satellite maintains a relatively static position. This connection way is only suitable for a solar direction detection satellite.

Figure 15:
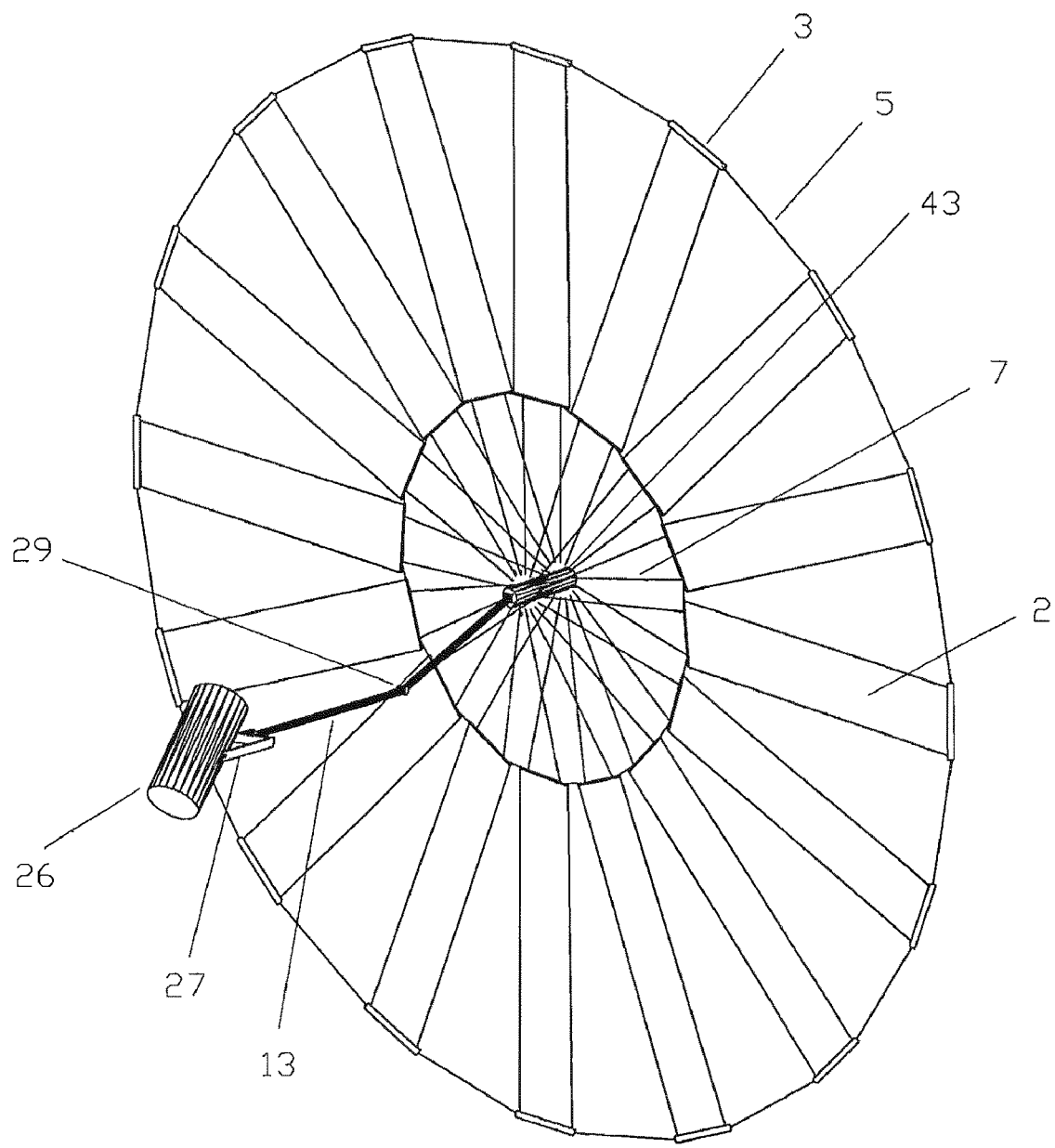
FIG. 15: Schematic Drawing for Thin Film Solar Battery Array Connecting Spacecraft with Pole Support

(B) universal holder connection plan: like FIG. 15 shows that the satellite (26) through the universal holder (27) and folding strut (13) connects to the end of a thin film battery center axle (43). The universal holder (27) looks like a U shaped fork. The two ends of U shaped fork connect to the satellite with a rotating axle. The satellite (26) can spin freely on the axle at the end of the universal holder, when the universal holder, taking the strut (13) as the axle center, spins together with the satellite. Thus satellite may independently choose a free direction and the thin film batteries may maintain to the solar direction. Between two struts as well as the strut and the end of the center axle (43) are connected with two universal joints (29) the rotation angle is controllable for the universal joints (29) (interior is loaded with electric motor.)

Figure 16:
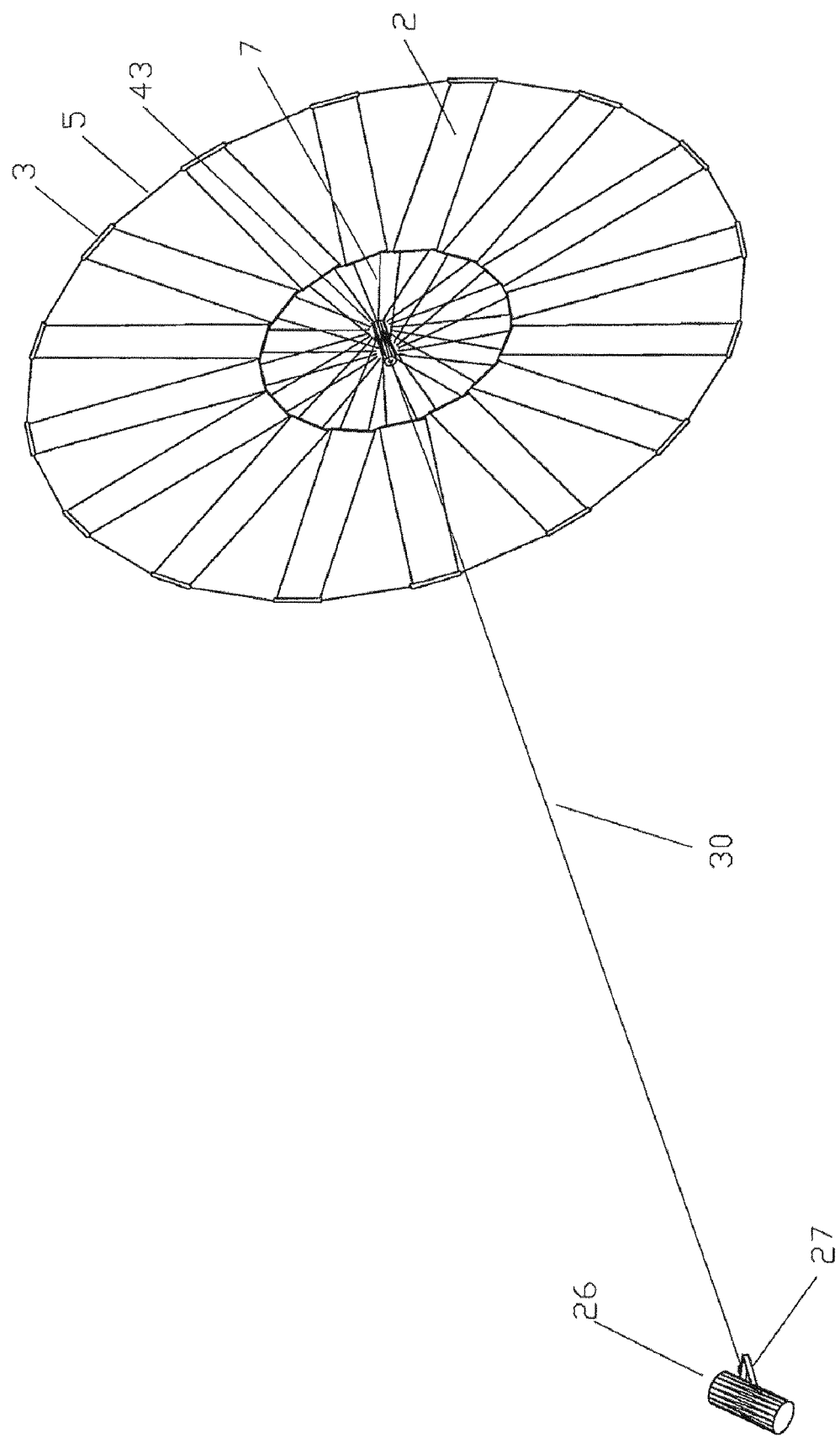
FIG. 16: Schematic Drawing for Thin Film Solar Battery Array Connecting Spacecraft with Draw Electrical Cable

(C) The connection with electrical cable towing plan: like FIG. 16 shows that the satellite (26) connects to the end of the center axle (43) of the film battery array through universal holder (27) and the towing electrical cable (30). Sunlight pressure causes thin film battery array to drift to where back to the sunlight on the satellite. Using this kind of towing connection for the satellite and film battery array is only suitable for 700 kilometer above the Earth orbit. (orbit below 700 kilometer, low-density atmosphere resistance is greater than light pressure action.)

Implementation Example 6

Figure 17:
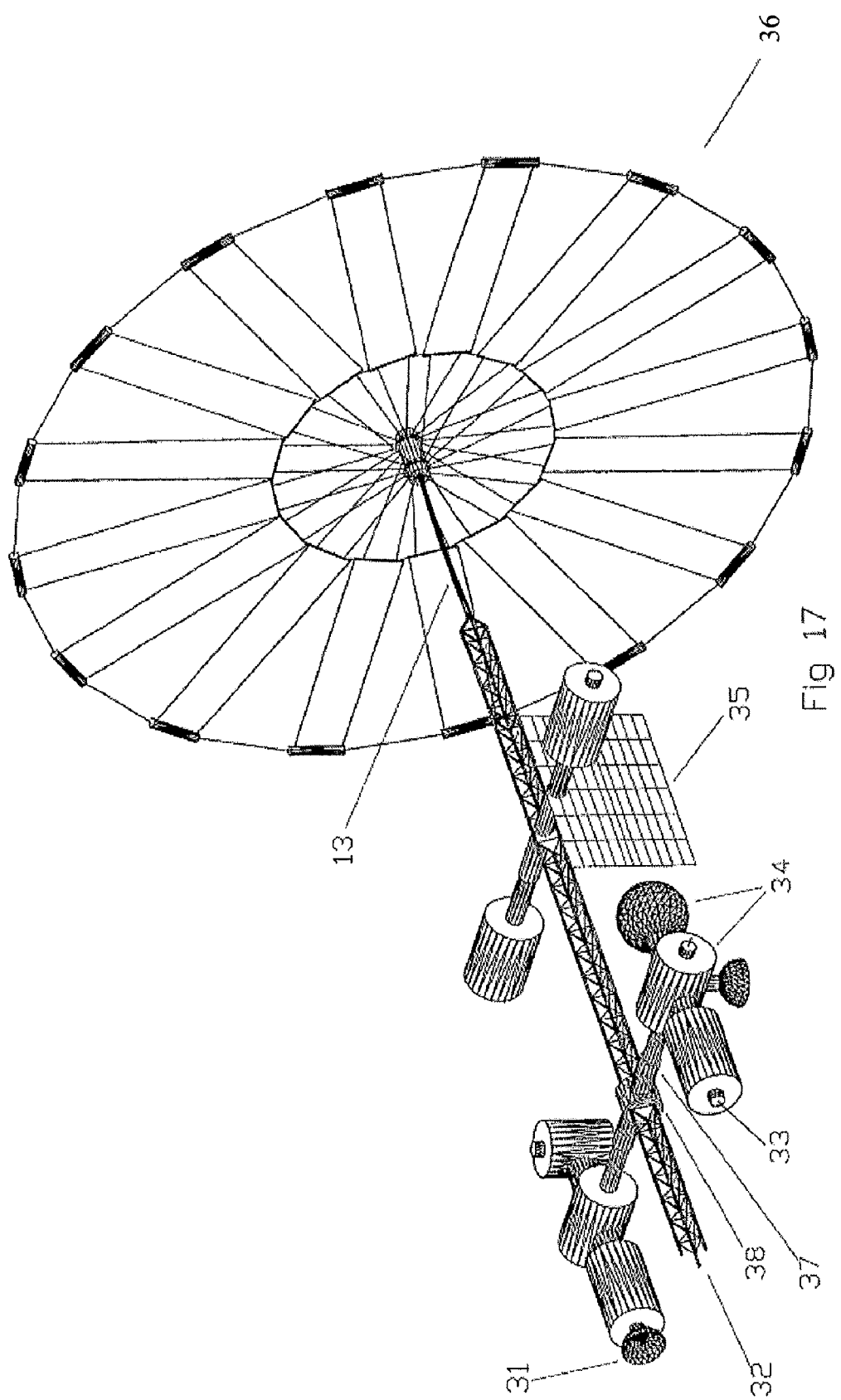
FIG. 17: Schematic Drawing 1 for Thin Film Solar Battery Array and Space Station Connection

The Thin Film Battery Array and Space Station Connection Plan (A) The main-beam connection plan: like FIG. 17 shows that the spacestation's main beam (32) is a truss construction. Atop a main beam (13) a thin film battery array (36) connects to the end of a central of center axle (43) through a pole support. Several spacelabs (34) are installed on the crossbeam (37). The crossbeam (37) links to the main truss (38) on the main beam through the main beam sleeve. The crossbeam (37) may spin on its own axis; the main beam sleeve (38) may spin around the main beam axis, and drive the crossbeam (37) to spin around the main beam, thus space station attached on the crossbeam may select any direction detecting method. FIG. 31) is the spacelab antenna. (33) is the spacelab entrance connection. And (35) is the hot radiation board on the crossbeam.

Figure 18:
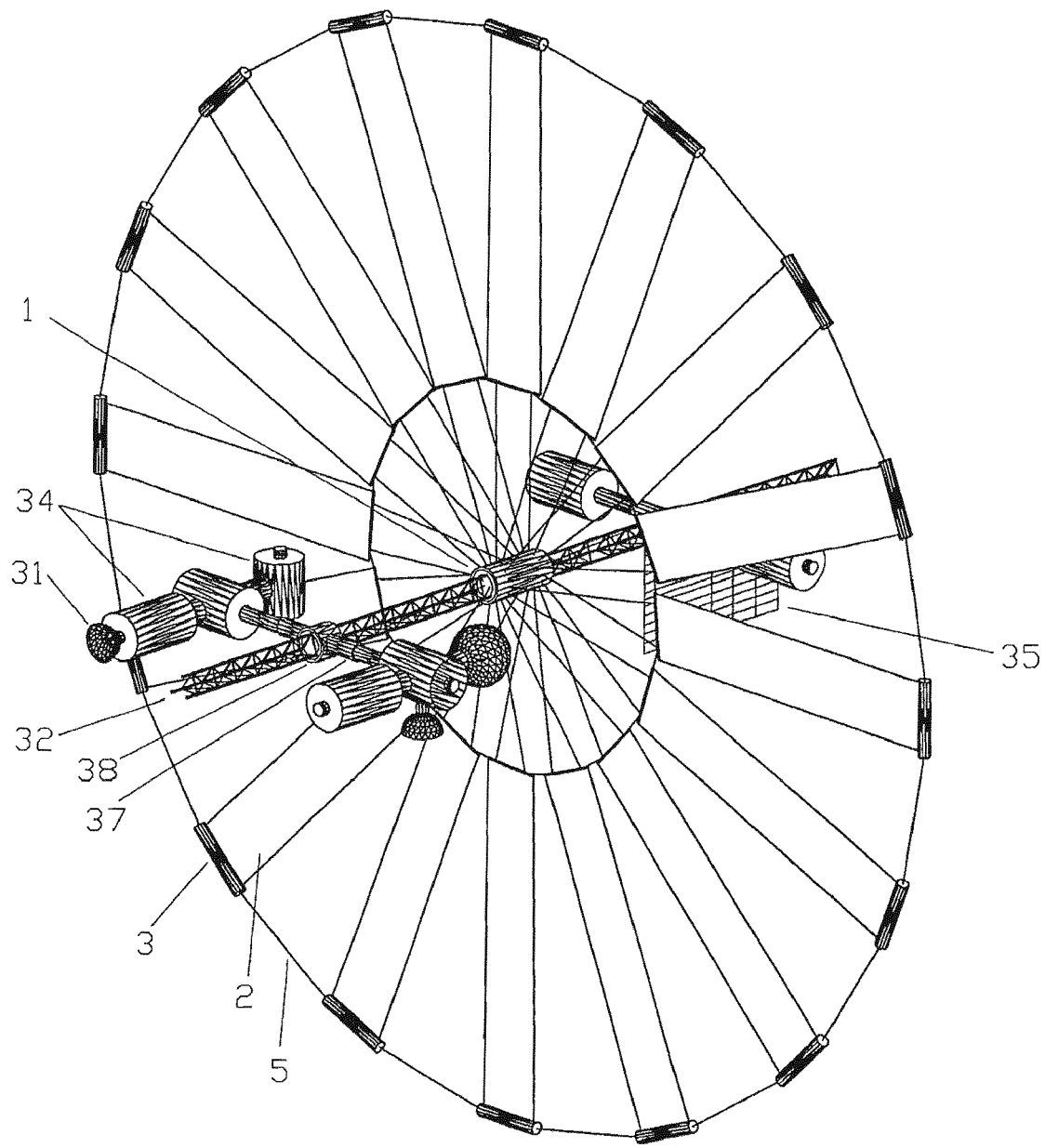
FIG. 18: Schematic Drawing 2 for Thin Film Solar Battery Array and Space Station Connection

(B) the middle-main-beam connecting plan: like FIG. 18 shows that thin film solar battery array (36) connects to the middle-main-beam (32) on the space station. The center axle (1) of a thin film solar battery array harnesses on the middle-section of main beam. The inner ring (39) of the center axle is fixed on the main beam. Spacelabs (34) are mounted on the both side of crossbeams (37) on the main beam. The main beam (32) and the thin film solar battery array are detecting sunlight direction. Spacelabs are installed on the crossbeam (37). They may adopt any way for direction detecting.

Implementation Example 7

Figure 19:
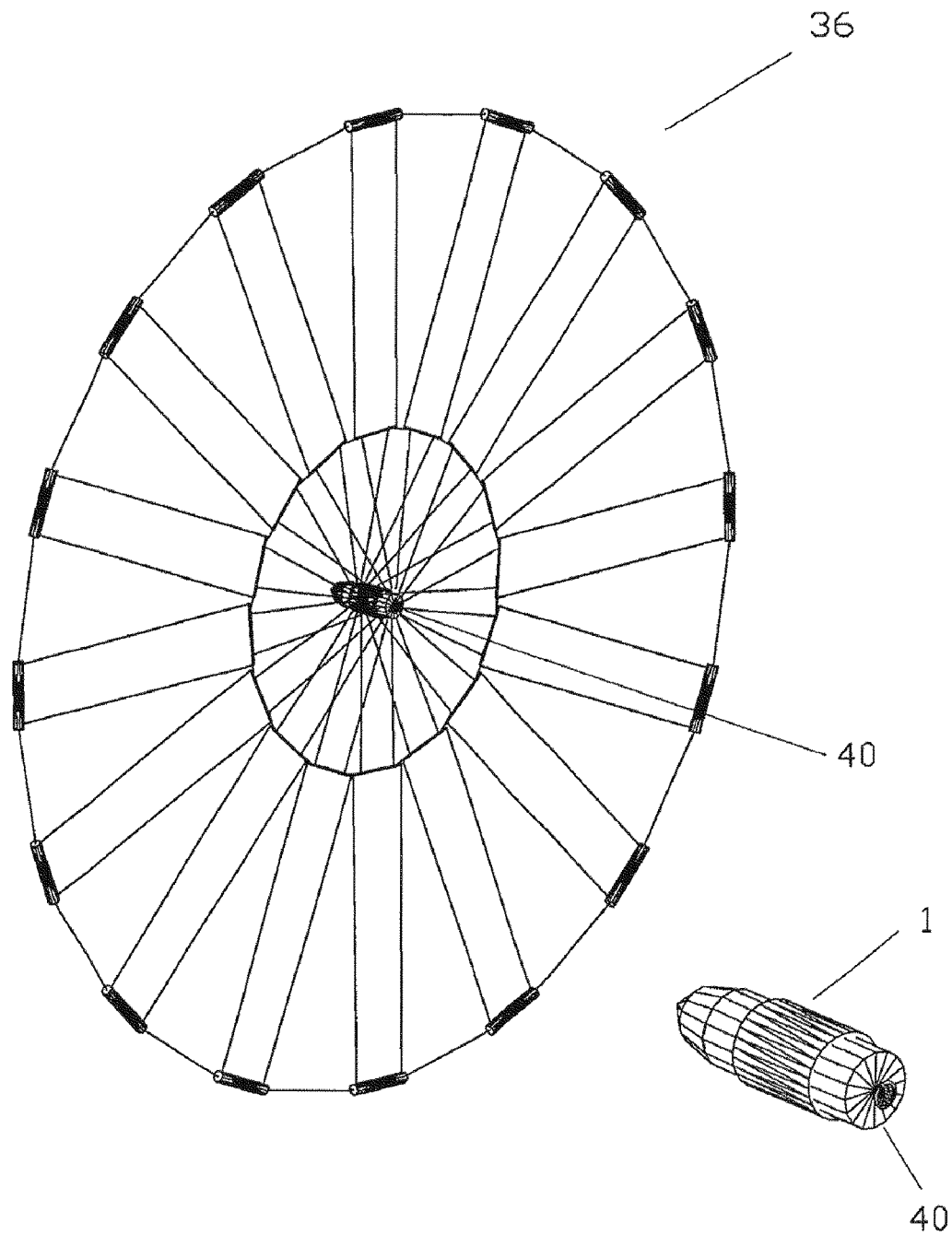
FIG. 19: Schematic Drawing A for Using Thin Film Solar Battery Array for Solar Energy electrically-powered Rocket FIG. 19 A: Schematic Drawing for Solar Energy Rocket.

A Thin Film Battery Array and Electrically-Powered Rocket Connecting Plan (A) The center-axle-joint plan: like FIG. 19 shows that the center axle (1) of a thin film battery array (36) sets on the cylindrical arrow body of an electrically-powered rocket (40). The installation of this kind plan for the center axle of the thin film battery array determines the axis, where the thin film battery array's plan is vertical to the electrically-powered rocket. Using is plan can not freely choice direction detection. When the electrically-powered rocket flies with its back to the sunlight, and so the array, therefore it should use implementation example 4 "a thin film battery array with fipover leaf blades". FIG. 19a is an enlarged drawing for electrically-powered rockets in FIG. 19. The FIG. 40) is the electrically-powered rocket. The center axle (1) sets on the electrically-powered rocket's outer shell.

Figure 20:
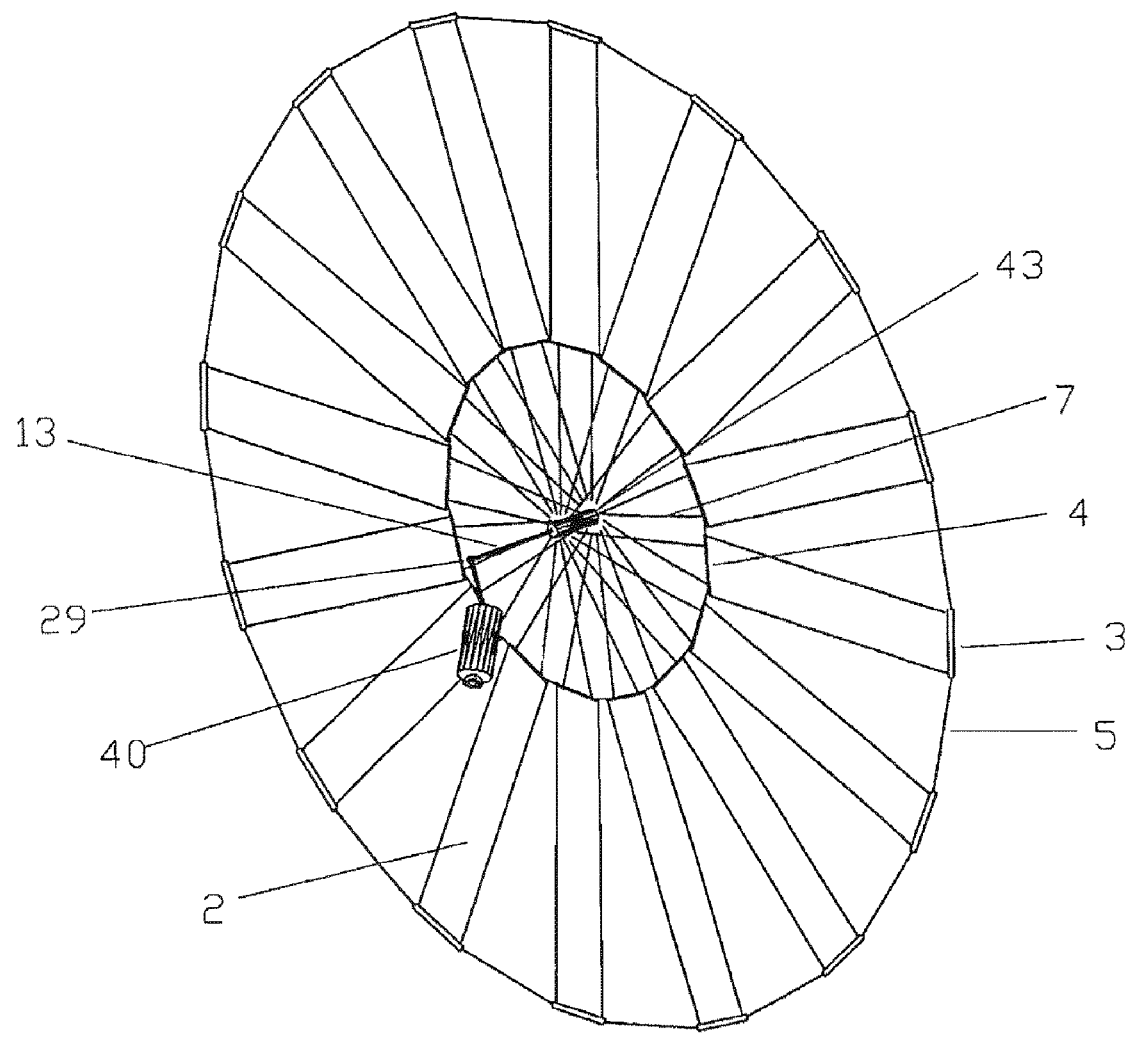
FIG. 20: Schematic Drawing B for Using Thin Film Solar Battery Array for Solar Energy Electrically-powered Rocket.

(B) The pole-support-connecting plan: like FIG. 20 shows that an electrically-powered rocket (40) connecting film solar battery array (36) with folding pole support (13), thus the two may select different direction detecting method to accept sunlight from the best angle. When a solar energy electrically-powered rocket flies on straight-line, it requires effective line of the electrically-powered rocket thrust force to pass through the center of entire spacecraft system.

Because the spacecraft does not have air drag in spaceflight, therefore the shape of the spacecraft and the electrically-powered rocket does not limit to a certain type. The solar energy electrically-powered rocket can fly high speed like a huge deployed umbrella in outer space. The solar energy electrically-powered rocket serves as the last stage rocket of a multi-stage rocket. After entering the Earth low orbit, the first stage rocket falls off, the thin film solar battery array is spinning to deploy itself, and the electrically-powered rocket starts to push the spacecraft to high orbit, or escapes from the Earth for an interstellar travel.

The fold and unfold structure of a thin film battery array is possible to use the pattern for a large scaled antenna in a spacecraft.

Using diffuse reflection film material of high reflectivity to replace the majority of thin film batteries in a thin film battery array may make an extremely bright man-made moon and may use electricity propeller to maintain track and attitude control.

Thin film batteries have performed a pilot test on the ground. It successfully deployed a thin film battery array, self rotating from a folding state into a circular planar array, and kept a long time stable state. Because of air drag and gravity, it is impossible to experiment with a long diameter thin film array. For the outer space micro gravity and high vacuum environment, that extremely favors a large-scale array deployment. Without interfering with air drag and gravity, a folded thin film battery array may steadily deployed with a very low spinning speed.

Above demonstrated examples and illustrated figures are specified to this invention, but this invention is not restricted to these specific implementation and examples. Any change or revising to this invention, technical plan or general constructed idea, will infringe on the requested right scope of this invention and general constructed idea.

What is claimed is:

1. A self-rotating deployed film solar battery array, comprising:
a plurality of film solar batteries;
a plurality of electrical cables;
a center axle positioned at a center of the array; and
a plurality of connecting lines,
wherein:
the plurality of film solar batteries radiate to form a circle or a polygon array; each two adjacent film solar batteries being linked by connecting lines, each film solar battery being linked to the center axle by electrical cables;
the plurality of film solar batteries being deployed and maintained in an array shape by centrifugal force in space;
the film solar batteries are coiled on an outer surface of the center axle before deployment thereof; and
the film solar battery array is used in spacecraft,
wherein:
each film solar battery array is shaped into a matrix of which a length-to-width ratio is greater than three, each film solar battery having an inside reinforcing rod positioned at a first end of the film solar battery adjacent the center axle and an outside reinforcing rod positioned at a second end of the film solar battery opposite the first end, an outer ring connecting line connecting ends of two adjacent outside reinforcing rods; an inner ring connecting line connecting two adjacent inside reinforcing rods at junctions M, N, respectively, each of junctions M, N being spaced away from a respective end of the corresponding inside reinforcing rod at a distance that equals to 25%-30% of a length of the corresponding inside reinforcing rod, each inner ring connecting line having a length equals to 50%-60% of the length of the corresponding inside reinforcing rods.

2. The self-rotating deployed film solar battery array in claim 1, wherein: each inner ring connecting line connects two adjacent inside reinforcing rods; inside each reinforcing rod, a small line-reel and micromotor is provided near an end of the reinforcing rod; after the film solar battery array is fully deployed, the micromotors pull the inner ring connecting lines into the corresponding inside reinforcing rods, driving the ends of the adjacent inside reinforcing rods close to each other; the length of the inner ring connecting lines being changed control tilted angle of the film battery array.

3. The self-rotating deployed film solar battery array in claim 1, wherein: the center axle of the film solar battery array has an inner ring and an outer ring; wheels, motors and electrical cable reels between the inner ring and outer ring are installed on an inner surface of a wall of the outer ring; grooves parallel to a longitudinal axis of the center axle are defined in the wall of the outer ring, an angular distance between each two adjacent grooves is 2π/n radian, wherein n is a number of film solar batteries; a plurality of holes are provided in the wall of the outer ring for the electrical cables to pass through; a length of the center axle is greater than a width of each film solar battery; when each film solar battery is coiled on the center axle, the inside reinforcing rods of the film solar batteries are placed in the grooves in the wall of the outer ring; the electrical cables connecting to the corresponding inside reinforcing rods pass through the corresponding holes in the wall of the outer ring and coil on the corresponding electrical cable reels the film solar batteries are face-up overlapping and coiling in the same direction on the outside of the center axle; after the film solar batteries are self rotating in a full deployment, the motors adjust the length of the electrical cables by driving the electrical cable reels, hence to control the inclining angle of a film solar battery and a center of gravity of the film solar battery array.

4. The self-rotating deployed film solar battery array in claim 1, wherein: an exterior of the center axle of the film solar battery array is a cylindrical shell with an umbrella column passing through a center of the center axle; two set of umbrella ribs are provided at both sides of the umbrella column, electrical cables pass through hollow umbrella ribs to connect the inside reinforcing rods of the film solar batteries; both sides of a wall of the center axle have n slits to open the umbrella ribs, wherein n is a number of film solar batteries.

5. The self-rotating deployed film solar battery array in claim 1, wherein: the film solar batteries are fan-shaped, and are arranged into a circle of radiating form, the adjacent film solar batteries connect each other by the corresponding outer ring connecting line and inner ring connecting line; each inside reinforcing rod has two opposite ends, each end is connected to the center axle by a corresponding electrical cable; the film solar batteries are counter-overlapped each other to coil on the center axle when being folded.

6. The self-rotating deployed film solar battery array in claim 1, wherein: each of the outside reinforcing rods the inside reinforcing rods has slide-blocks, an inner ring connecting line and an outer ring connecting line are connected to the slide-blocks of the inside and outside reinforcing rods respectively; under the driving force coming from a corresponding micromotor, the slide-blocks slide from one end to the other end on the reinforcing rod to turn over the corresponding film solar battery.

7. The self-rotating deployed film solar battery array in claim 1, wherein: the center axle harnesses on a cylindrical spacecraft, the film solar battery array deploys around the spacecraft.

8. The self-rotating deployed film solar battery array in claim 1, wherein: the center axle of the array connects a satellite with a pole support and a universal holder, the universal holder is a U shaped fork, two ends of the U shaped fork connect a rotating axle to the satellite.

9. The self-rotating deployed film solar battery array in claim 1, wherein: an end of the center axle of the array is connected to a satellite by an electric driving-cable and a universal holder, the film solar battery array is drifting on the side where the satellite is back to the sunlight.

10. The self-rotating deployed film solar battery array in claim 1, wherein: an end of a main-beam of a space station is connected to an end of the center axle of the film solar battery array by a pole support, a capsule is fixed on a cross-beam that rotates around the main-beam.

11. The self-rotating deployed film solar battery array in claim 1, wherein: the center axle of the film solar battery array harnesses on a main-beam of a space station; an inner ring of the center axle is fixed on the main beam and a capsule is fixed on a cross-beam that rotates around the main-beam.

12. The self-rotating deployed film solar battery array in claim 1, wherein: an end of the center axle is connected to an electrically-powered rocket by a pole support, an action line of the electrically-powered rocket's thrust force runs through the center of entire spacecraft system.

13. The self-rotating deployed film solar battery array in claim 1, wherein: a diffuse reflection film material of high reflection coefficient is used to replace a majority of the film solar batteries in the film solar battery array to make an man-made moon.

* * * * *